United States Patent
Shephard

[11] Patent Number: 6,142,521
[45] Date of Patent: Nov. 7, 2000

[54] VEHICLE CRASH PROTECTIVE SYSTEM

[76] Inventor: Mark E. Shephard, 6649 Waterstone Dr., Indianapolis, Ind. 46268

[21] Appl. No.: 09/116,326

[22] Filed: Jul. 15, 1998

[51] Int. Cl.[7] ................................................. B60R 21/02
[52] U.S. Cl. ...................... 280/748; 280/728.1; 280/751; 296/198
[58] Field of Search ............................ 280/728.1, 730.1, 280/736, 738.2, 751, 748; 296/198

[56] References Cited

U.S. PATENT DOCUMENTS

| | | | |
|---|---|---|---|
| 2,959,446 | 11/1960 | Thompson | 280/728.1 |
| 3,243,822 | 4/1966 | Lipkin | 280/728.1 |
| 3,370,886 | 2/1968 | Frost | 280/728.1 |
| 3,642,303 | 2/1972 | Irish et al. | 280/728.1 |
| 3,831,972 | 8/1974 | Allgaier et al. | 280/728.1 |
| 3,909,058 | 9/1975 | Kramer et al. | 296/28 R |
| 3,927,901 | 12/1975 | Weman | 280/728.1 |
| 4,756,551 | 7/1988 | Miller | 280/751 |
| 5,056,816 | 10/1991 | Lutze et al. | 280/751 |
| 5,222,761 | 6/1993 | Kaji et al. | 280/730.1 |
| 5,310,214 | 5/1994 | Cuevas | 280/729 |
| 5,312,131 | 5/1994 | Kitagawa et al. | 280/728.1 |
| 5,344,184 | 9/1994 | Keeler et al. | 280/728.1 |
| 5,470,103 | 11/1995 | Vaillancourt et al. | 280/730.1 |
| 5,507,519 | 4/1996 | Schettler-Kohler | 280/730.1 |
| 5,575,497 | 11/1996 | Suyama et al. | 280/730.1 |
| 5,609,363 | 3/1997 | Finelli | 280/743.2 |
| 5,646,613 | 7/1997 | Cho | 340/903 |
| 5,695,242 | 12/1997 | Brantman et al. | 280/728.1 |
| 5,895,088 | 4/1999 | Knott | 296/188 |
| 5,947,513 | 9/1999 | Lehto | 280/730.1 |
| 5,951,097 | 9/1999 | Esposito et al. | 286/188 |
| 5,997,037 | 12/1999 | Hill et al. | 280/743.2 |

FOREIGN PATENT DOCUMENTS 30 32 444 A1   4/1982   Germany.

*Primary Examiner*—J. J. Swann
*Assistant Examiner*—L. Lum
*Attorney, Agent, or Firm*—Woodard, Emhardt, Naughton, Moriarty & McNett

[57] ABSTRACT

Crash protective surrounds for a vehicle passenger. Permanently inflated cushions are mounted within the fenders and behind the rear seat. A rear seat cushion and a front seat cushion are expandable in a vertical direction and then across the passenger seats. The front cushion and rear cushion tilt forward away from the passenger limiting bag expansive forces against the passenger.

4 Claims, 5 Drawing Sheets

VEHICLE CRASH PROTECTIVE SYSTEM

BACKGROUND OF THE INVENTION

1. Field of the Invention

The present invention is in the field of air bags and other cushions used to provide a protective passenger environment.

2. Description of the Prior Art

A variety of air bags and cushions have been developed to provide a protective environment for a vehicle passenger in a crash or emergency condition. The cushions may be permanently inflated or may be quickly inflated by means of a source of pressurized fluid once a detector determines a predetermined change in vehicle velocity. Cushions may be arranged along the front, sides and rear of the vehicle such as disclosed in the U.S. Pat. No. 5,646,613 issued to Cho. U.S. Pat. No. 3,909,058 issued to Kramer et al., and the German Patent DE 3,032,444 issued to Apprich.

Typically, air bags extend outwardly from the steering wheel or dashboard or from the doors adjacent the seat. It is also known to extend the air bag in an upward position initially being located beneath the passenger knees such as shown in U.S. Pat. No.5,344,184 issued to Keeler et al. Some air bags extend outwardly from the console located between the driver and passengers, such as shown in U.S. Patent 5,312,131 issued to Kitagawa et al. An example of an inflatable air bag mounted to the rear of the seat is shown in U.S. Pat. No. 3,370,886 issued to Frost.

Despite the prior devices, there is still a need for improved cushions for providing a protective environment for a passenger in an emergency or crash situation. It has been noted that injuries occur in certain instances as a result of the air bag expanding in a rearward direction toward the face and chest of a passenger. In this instance what is needed is an air bag or fluid bag which expands from the passenger in a forward direction thereby providing a cushion without expanding force being applied to the passenger. Disclosed herein is such a device.

SUMMARY OF THE INVENTION

One embodiment of the present invention is a crash protective surrounds for a vehicle having a front with fenders, a rear, a passenger compartment with a seat and a vehicle longitudinal axis extending in a direction through the compartment from the front toward the rear comprising front cushions for front impact crash protection mountable to the vehicle forward of the passenger compartment. Also included is a rear cushion for rear impact crash protection mountable to the vehicle aft of the passenger compartment and a source of pressurized fluid mountable in the vehicle. A first seat interior cushion is mountable to the vehicle and connected to the source of pressurized fluid being expandable first upwardly within the passenger compartment adjacent the seat and then in a forward direction away from the seat limiting expansion of the interior cushion toward a passenger sitting upon the seat. A fastener is mountable to the vehicle forward of the interior cushion and is operable to hold the interior cushion upright when the interior cushion is expanded forwardly against the fastener.

It is an object of the present invention to provide a new and improved crash protective surrounding environment for a passenger within a vehicle.

A further object of the present invention is to provide an air or fluid bag, expandable in the forward direction from the passenger eliminating expansive forces applied to the passenger.

A further object of the present invention is to provide a combination of an interior cushion expandable away from the passenger in combination with cushions located at the front and rear of the vehicle.

Related objects and advantages of the present invention will be apparent from the following description.

DESCRIPTION OF THE PREFERRED EMBODIMENT

Figure 1:
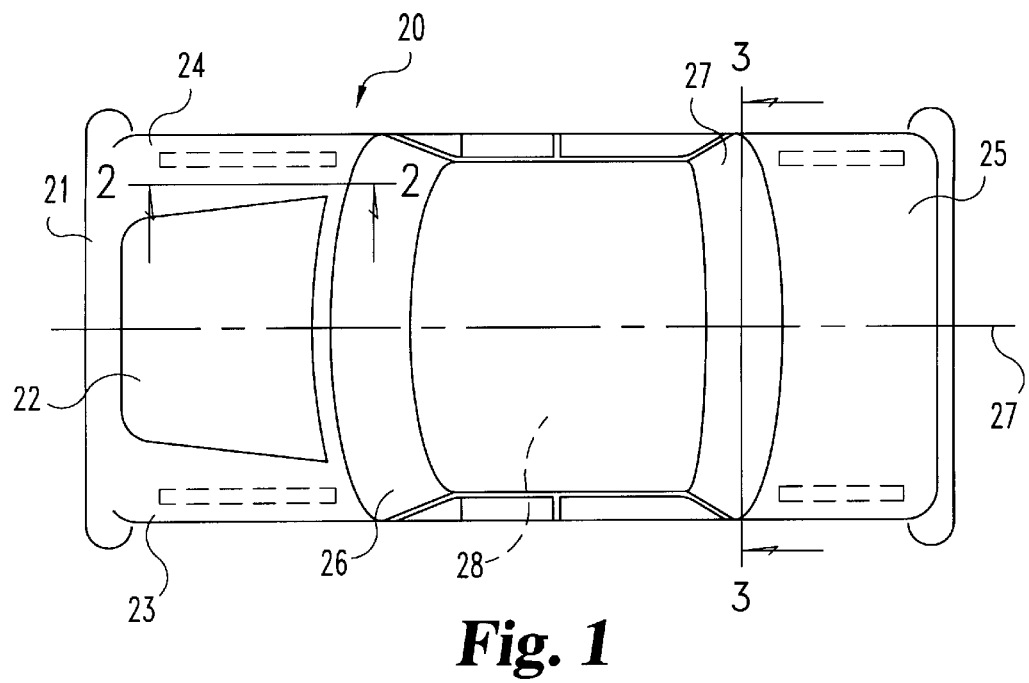
FIG. 1 is a top plan view of a vehicle incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown vehicle 20 having a front 21 with a conventional hood 22, left fender 23, and right fender 24. Vehicle 20 has a rear 25 with a conventional trunk. The passenger compartment 28 is located between the front windshield 26 and rear windshield 27 with the longitudinal axis 27 extending the length of the vehicle from the front 21 to the rear 25.

The crash protective surrounds for vehicle 20 includes front cushions mounted within the front wheel wells, a rear cushion mounted behind the rear seat, a first or front interior cushion and a rear interior cushion mounted adjacent respectively the front and rear seats. The front and rear interior cushions are connected to a source of pressurized fluid for inflating once a detector determines the vehicle velocity has changed a predetermined amount.

Figure 2:
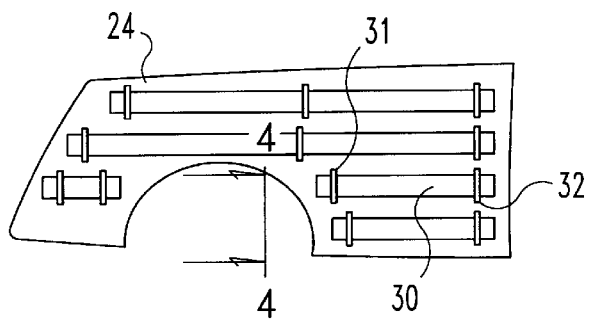
FIG. 2 is an enlarged cross-sectional view of the right front fender taken along the line 2—2 of FIG. 1 and viewed in the direction of the arrows.
Figure 4:
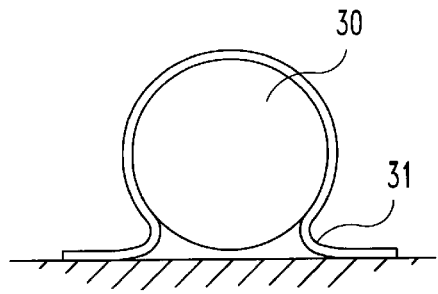
FIG. 4 is an enlarged end view taken along the line 4—4 of FIG. 2 and viewed in the direction of the arrows.

A plurality of front cushions are mounted to the front fenders adjacent the wheel wells. For example, a permanently inflated cushion 30 (FIG. 2) is fixedly mounted by a pair of metal straps 31 and 32 riveted to the inside of the right front fender 24 adjacent the wheel well. Cushion 30 as well as identical cushions mounted interiorly to the left front fender 23 absorb a front impact crash located forward of the vehicle compartment 28. Each cushion 30 extends horizontally in the direction of axis 27. Reinforcement steel plates may be mounted adjacent each cushion 30 (FIG. 4) and the companion cushions in the left front fender 23 in order to add structural rigidity and to protect the cushions from destruction. Straps 31 and 32 (FIG. 4) provide a metal frame from mounting the tubular cushion. The cushions within the front fenders are permanently inflated.

Figure 3:
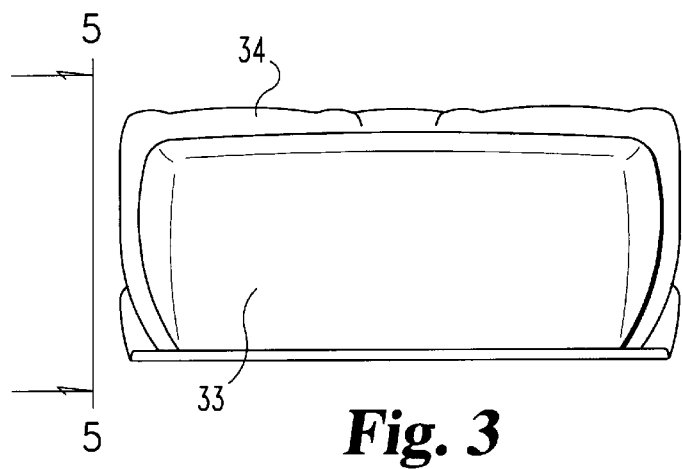
FIG. 3 is an enlarged cross-sectional view of the back of the rear seat taken along the line 3—3 of FIG. 1 and viewed in the direction of the arrows.

A rear cushion 33 (FIG. 3) is mounted directly to the back of the rear seat 34 extending across the width of the vehicle and further extending from the top of the seat to the bottom of the seat. Rear cushion 33 is a permanently inflated air bag to absorb rear impact crash and is mounted to the vehicle at or behind the passenger compartment 28. Rear cushion 33 is mounted to the rear seat with conventional fastening devices.

Figure 5:
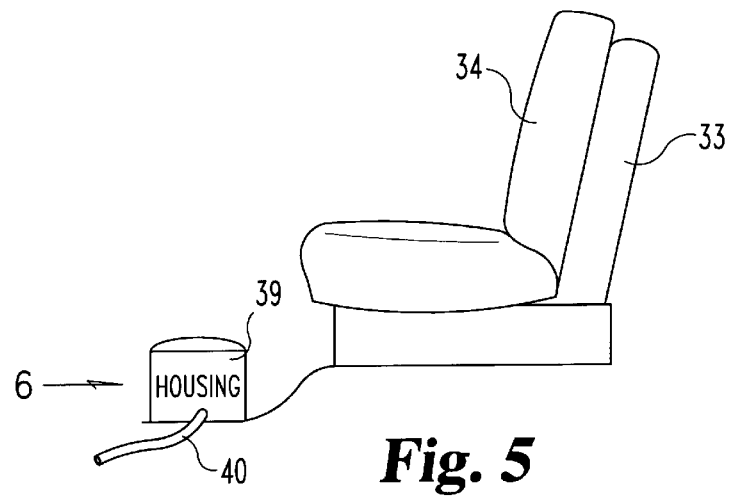
FIG. 5 is a side view of the rear seat taken along the line 5—5 of FIG. 3 and viewed in the direction of the arrows showing the rear interior cushion in the collapsed position.
Figure 6:
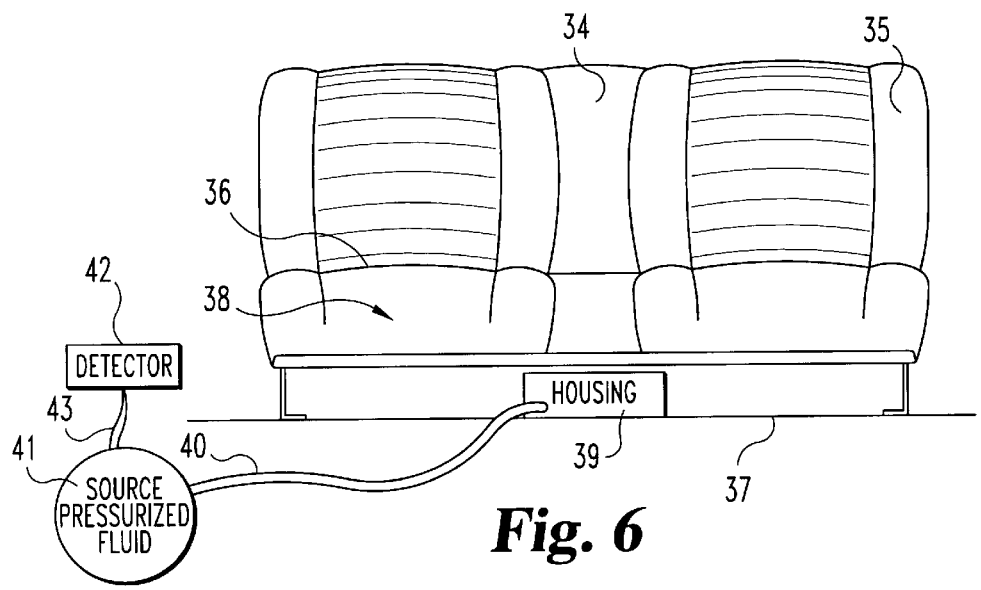
FIG. 6 is a front view of the rear seat taken along the line 6—6 of FIG. 5 showing the rear interior cushion connected to a source of pressurized fluid.

Rear seat 34 (FIG. 6) includes a backrest portion 35 and a seat portion 36 mounted to vehicle floor 37, which, in turn, forms a well or recess 38 receiving the passengers feet. Located midway between the sides of the vehicle and between the two passengers is an air bag housing 39. The housing contains an expandable air or fluid bag which first extends upwardly and then across and in front of the passenger. In normal operation, the air bag is compacted within housing 39 in a stored position (FIG. 5) but is expandable upward into a T configuration as illustrated in FIG. 7.

Figure 7:
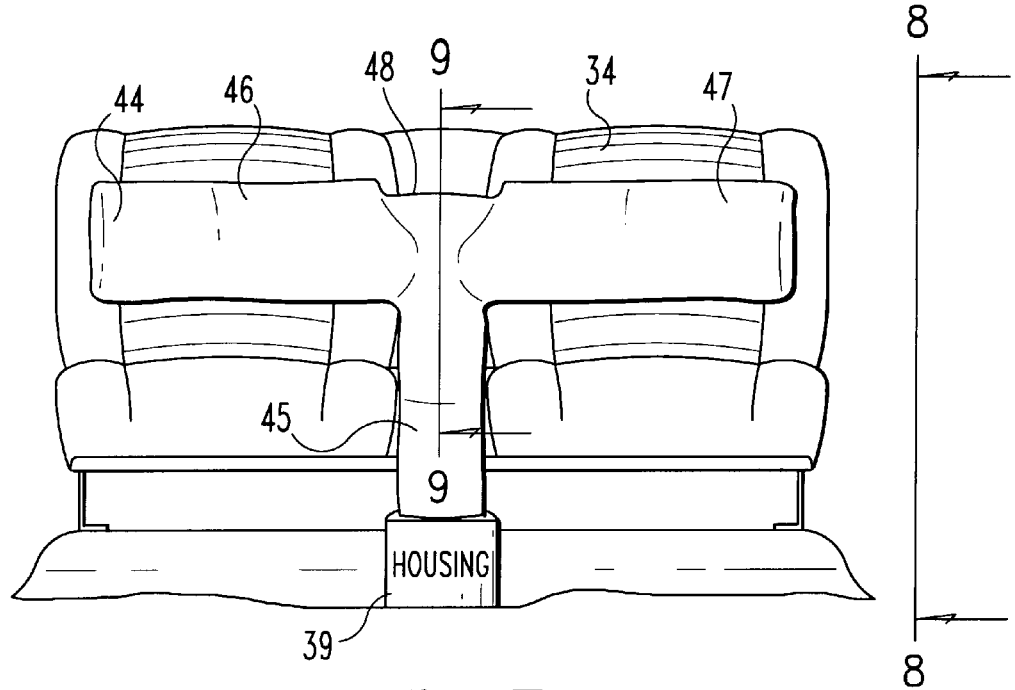
FIG. 7 is the same view as FIG. 6 only showing the rear interior cushion in the expanded or in-use position.

The air or fluid bag 44 when in the inflated or in-use position of FIG. 7 includes a vertically extending portion 45 and a pair of horizontally extending portions 44 and 47. The horizontally extending portions 44 and 47 are connected to the vertically extending portion 45 and receive pressurized air or fluid forced through the vertically extending portion 45 and eventually into the horizontally extending portions 46 and 47. A conventional source or canister 41 (FIG. 6) of pressurized air or fluid is connected by a hose 40 to the bottom of vertically extending portion 45. A conventional motion detector, such as an accelerometer 42, is connected by wiring 43 to source 41 with the detector 42 and source 41 operable upon a predetermined change in the vehicle velocity to force the pressurized air or fluid into vertically extending portion 45. The bottom of portion 45 is mounted to housing 39 and is sealingly connected to hose 40, shown in fragment in the drawing, to ensure the pressurized fluid from source 41 is directed into portion 45. Likewise, horizontally extending portions 46 and 47 are sealingly connected to the vertically extending portion 45 to ensure the pressurized fluid flowing upward through portion 45 eventually flows into portions 46 and 47.

Figure 8:
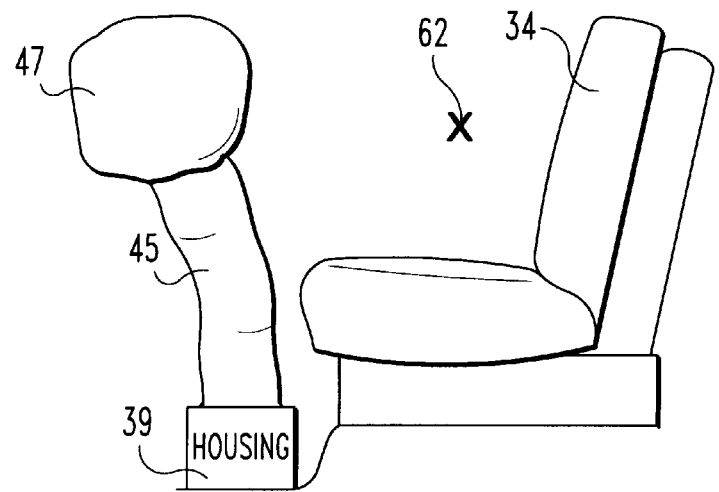
FIG. 8 is a side view taken along the line 8—8 of FIG. 7 and viewed in the direction of the arrows.
Figure 9:
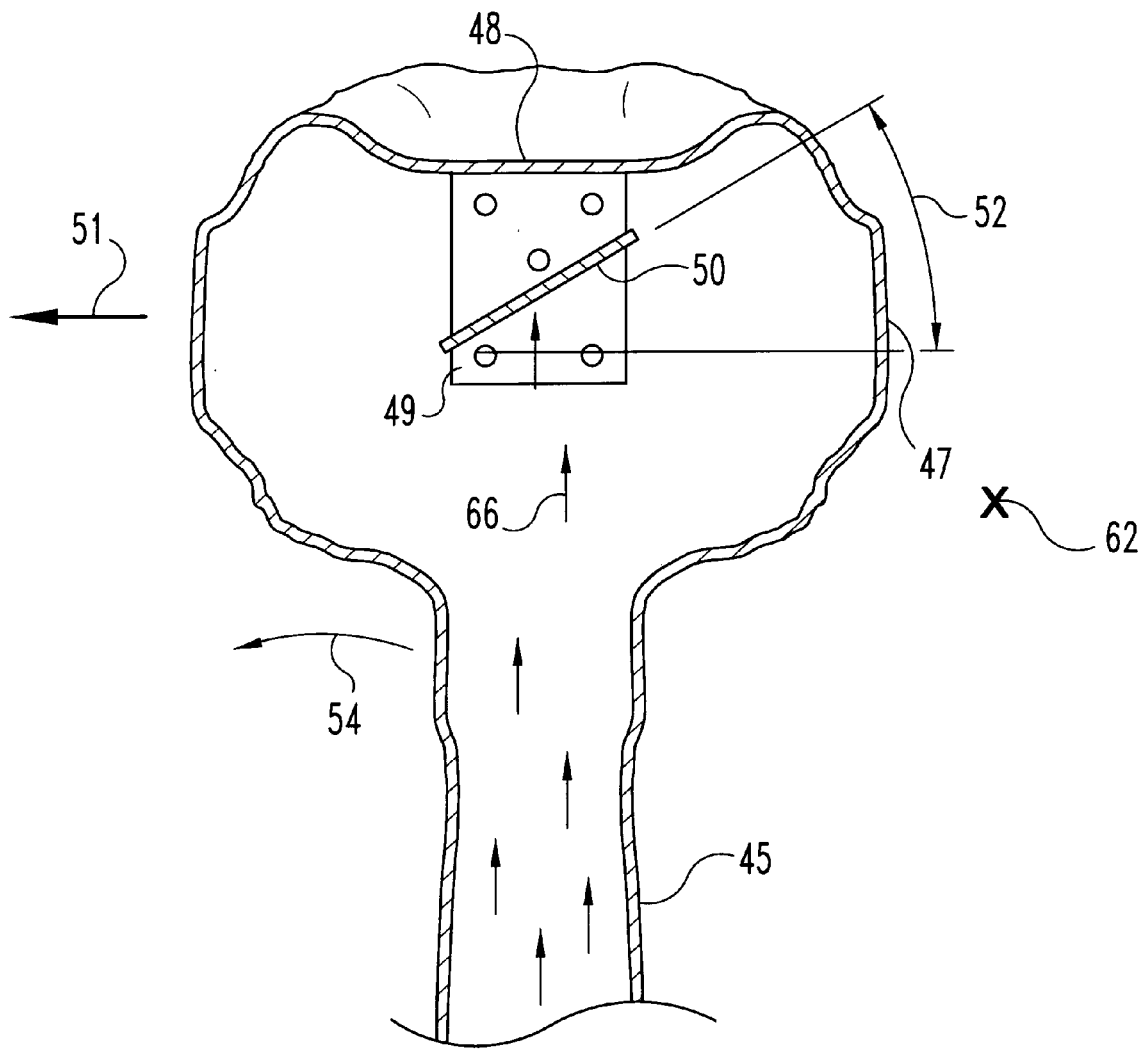
FIG. 9 is an enlarged fragmentary cross-sectional view taken along the line 9—9 of FIG. 7 and viewed in the direction of the arrows.

The top 48 of bag 44 has depending therefrom a wall or a frame 49 (FIG. 9) to which is mounted a deflector plate 50. The bottom surface of plate 50 forms a positive acute angle 52 relative to axis 27, which extends towards the front of the vehicle in the direction of arrow 51. Thus, the pressurized fluid flowing through vertically extending portion 45 in the upward direction 66 contacts plate 50 with the plate being arranged non-perpendicularly relative to the flow arrow 53. A force component is therefore applied in the direction of arrow 51 to plate 50 causing the bag to pivot in the forward direction 54 away from the passenger resting atop seat 34 in location 62. Vertically extending portion 45 is produced from flexible material, such as rubber, or fabric and therefore will bend or tilt from the initial position of FIG. 9 to the final position of FIG. 8. The rear airbag 44 is therefore tiltably mounted to the vehicle with plate 50 being a fluid direction means operable to direct the incoming pressurized fluid in a forward direction expanding the bag not only horizontally across the width of the vehicle but also in a forward direction along axis 27. The pressurized fluid contacting plate 50 applies force to the plate which, in turn, transfers the force to the bag and the vertically extending portion 45. Thus, the problem encountered from conventional airbags which are expanded outward against the passenger is not present in the airbag depicted in the drawings. Frame 49 does not extend across each horizontally extending portion 46 and 47 and thus does not impede the flow of pressurized fluid from vertical portion 45 into horizontally extending portions 46 and 47. Further, frame 49 may be provided with a plurality of apertures through which the pressurized fluid may flow.

The sequence of operation for the rear airbag 44 includes first the release of pressurized force from source 41 once detector 42 has detected an emergency or crash situation. The bag expands outwardly from housing 39 in a first vertically upward direction (FIG. 9) and then in a forward direction 51 and in a widthwise direction across the vehicle seat with rearward expansion of portions 46 and 47 being limited in a direction opposite of arrow 51. The rear cushion or bag 44 is located rearwardly in passenger compartment 28 adjacent the rear seat 34. Likewise, a similar cushion or airbag is provided forward in compartment 28 adjacent the front seat.

Figure 10:
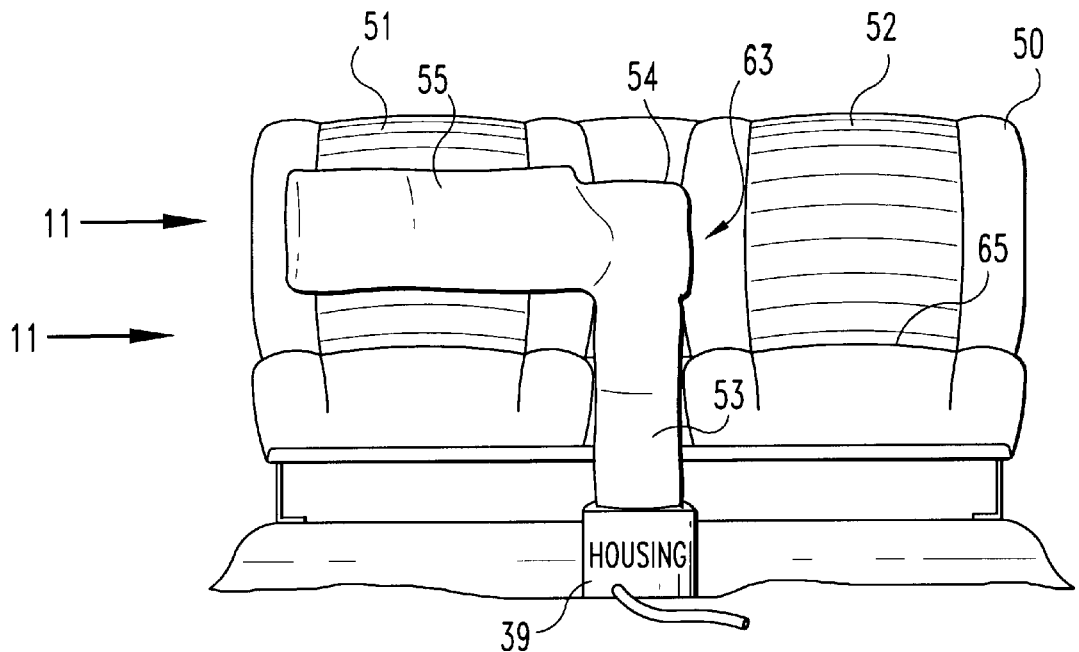
FIG. 10 is a front view looking rearward of the front seat and associated front interior cushion.
Figure 11:
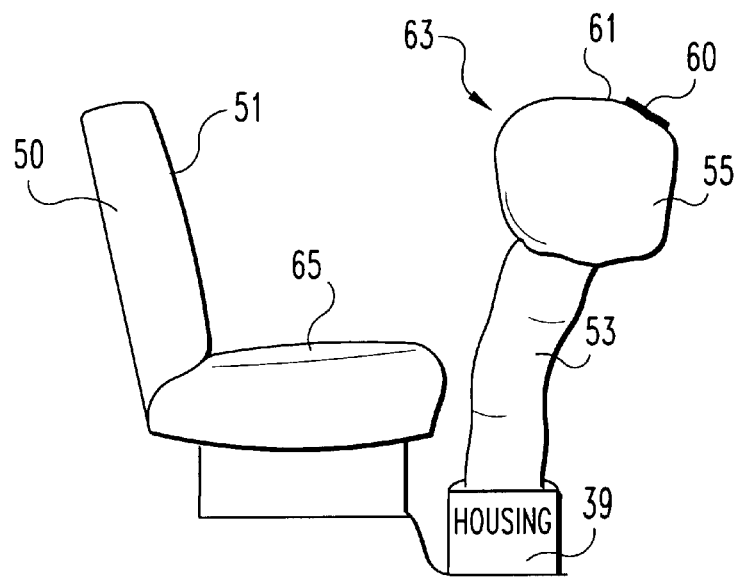
FIG. 11 is a side view of the front seat looking in the direction of arrows 11—11 of FIG. 10.

Front seat 50 (FIG. 10) includes a driver side back support portion 52 and a passenger support back portion 51 extending upwardly from the horizontally extending seat portion 65. Located between the passenger side 51 and driver side 52 is a housing 39 identical to the housing described for the rear seat. An air or fluid bag 63 is provided within housing 39 identical to bag 44 with the exception that the vertically extending portion 53 of the bag is connected to only a single horizontally extending portion 55. Thus, the bag extends across the width of only the passenger side of the front seat and not across the drivers side. A deflector plate is mounted within the airbag being secured by a frame attached to top 54 in a manner as previously described for bag 44 resulting in the front bag expanding first upwardly and across the passenger in the direction of the vehicle width and tilting toward the front of the vehicle as depicted in FIG. 11 away from the passenger limiting expansive forces from the bag toward the passenger. In addition, the possibility of passenger suffocation is reduced since the bag is not force in a rearward direction against the passenger's face.

A conventional fastening strip 60 is permanently mounted to the headliner ceiling of the passenger compartment and is operable to releasably engage the outwardly facing surface 61 of portion 55 of the front bag 63 when expanded thereagainst. Strip 60 may include, for example, a fastening device similar to VELCRO® with the outwardly facing surface 61 cooperating therewith. The purpose of strip 60 is to hold the bag in an expanded position until manually pulled therefrom. In addition, the fastening strip ensures the bag will not bounce backward toward the passenger once it contacts the windshield and passenger compartment ceiling.

Many variations are contemplated and included in the present invention. For example, the present system contemplates including side air cushions mounted within the doors to further provide a protective surrounding boundary.

Alternative means may be employed in lieu of plate 50 to cause bags 44 and 63 to pivot in the forward direction. For example, fluid pressure release means, such as, an opening leading to the outside environment, may be provided in vertically extending portions and 45 and 53 and positioned so that the rush of the pressurized fluid therethrough causes the bag to tilt forwardly. At the same time, a portion of the air flowing upwardly through the vertically extending portions must be retained in the air bag so that the horizontally extending portions inflate across the width of the seat as well as in the forward direction away from the passenger.

Although not depicted in the drawings, the present invention includes placing horizontally extending permanently inflated tubes within the engine compartment with the tubes being attached to the hood and extending in the direction of the longitudinal axis of the vehicle. Likewise, a plurality of cushions identical to cushion 30 are mounted within the doors and the rear fenders and extend in the direction of axis 27.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. Crash protective surrounds for a vehicle having a front with fenders, a rear, a passenger compartment with a seat and a vehicle longitudinal axis extending in a direction through the compartment from the front toward the rear comprising:

a front cushion for front impact crash protection mountable to the vehicle forward of the passenger compartment:

a rear cushion for rear impact crash protection mountable to said vehicle aft of said passenger compartment;

a source of pressurized fluid mountable in said vehicle;

a first seat interior cushion mountable to said vehicle and connected to said source of pressurized fluid being expandable first upwardly within said passenger compartment adjacent the seat and then in a forward direction away from the seat limiting expansion of said interior cushion toward a passenger sitting upon the seat, said interior cushion when inflated by said source of pressurized fluid includes a vertically extending portion and a horizontally extending portion connected together, said horizontally extending portion extending forwardly across the seat in front of a passenger sitting upon the seat; and wherein said front cushion includes:

a pair of front cushions mounted within said fenders, said cushions include metal frames mounted thereto with said frames mountable forwardly of the passenger compartment within the fenders and extending in the direction of the longitudinal axis to absorb a front impact crash toward the seat.

2. The surrounds of claim 1 wherein:

said rear cushion is inflated at all times and extends across aft of the seat to absorb a rear impact crash toward the seat.

3. The surrounds of claim 2 and further comprising:

a rear seat interior cushion mountable to said vehicle and connected to said source of pressurized fluid being expandable first upwardly within said passenger compartment and then in a forward direction limiting expansion of said rear seat interior cushion in a rearward direction, said first seat interior cushion located forwardly in the passenger compartment and said rear seat interior cushion located rearwardly in the passenger compartment.

4. Crash protective surrounds for a vehicle having a front with fenders, a rear, a passenger compartment with a seat and a vehicle longitudinal axis extending in a direction through the compartment from the front toward the rear comprising:

a front cushion for front impact crash protection mountable to the vehicle forward of the passenger compartment:

a rear cushion for rear impact crash protection mountable to said vehicle aft of said passenger compartment;

a source of pressurized fluid mountable in said vehicle;

a first seat interior cushion mountable to said vehicle and connected to said source of pressurized fluid being expandable first upwardly within said passenger compartment adjacent the seat and then in a forward direction away from the seat limiting expansion of said interior cushion toward a passenger sitting upon the seat; and wherein said front cushion includes:

a pair of front cushions mounted within said fenders, said front cushions mountable forwardly of the passenger compartment within the fenders and extending in the direction of the longitudinal axis to absorb an impact crash.

* * * * *

UNITED STATES PATENT AND TRADEMARK OFFICE
CERTIFICATE OF CORRECTION

PATENT NO. : 6,142,521
DATED : November 7, 2000
INVENTOR(S) : Mark E. Shephard

It is certified that error appears in the above-identified patent and that said Letters Patent is hereby corrected as shown below:

Column 3,
Line 62, please change "53" to -- 66 --.

Signed and Sealed this

Twentieth Day of November, 2001

Attest:

*Attesting Officer*

NICHOLAS P. GODICI
*Acting Director of the United States Patent and Trademark Office*